US 8,705,539 B2
*Apr. 22, 2014

(12) United States Patent
White et al.

(10) Patent No.: US 8,705,539 B2
(45) Date of Patent: *Apr. 22, 2014

(54) DETERMINING A ROUTE ADVERTISEMENT IN A REACTIVE ROUTING ENVIRONMENT

(75) Inventors: Russell I. White, Holly Springs, NC (US); Steven Edward Moore, Holly Springs, NC (US); James L. Ng, Mebane, NC (US); Alvaro Enrique Retana, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/345,003

(22) Filed: Jan. 6, 2012

(65) Prior Publication Data

US 2012/0106395 A1   May 3, 2012

Related U.S. Application Data

(63) Continuation of application No. 11/949,561, filed on Dec. 3, 2007, now Pat. No. 8,121,130.

(51) Int. Cl.
*H04L 12/28* (2006.01)
*H04L 12/56* (2011.01)
*G06F 15/177* (2006.01)
*G06F 15/173* (2006.01)

(52) U.S. Cl.
USPC ...... 370/395.54; 370/390; 370/401; 709/220; 709/238; 709/247

(58) Field of Classification Search
USPC ............. 370/395.54, 390, 401, 389; 709/238, 709/220, 247
See application file for complete search history.

(56) References Cited

U.S. PATENT DOCUMENTS

| 5,774,662 A | 6/1998 | Sakagawa |
| 6,098,157 A | 8/2000 | Hsu et al. |

(Continued)

FOREIGN PATENT DOCUMENTS

| EP | 0691772 A2 | 1/1996 |
| EP | 0978966 A1 | 2/2000 |

OTHER PUBLICATIONS

U.S. Appl. No. 11/949,561, Non-Final Office Action mailed Jul. 21, 2010, 28 pgs.

(Continued)

*Primary Examiner* — Ronald Abelson
(74) *Attorney, Agent, or Firm* — Schwegman Lundberg & Woessner, P.A.

(57) ABSTRACT

In an example embodiment, a method and system is provided to determine and advertise a route advertisement in a reactive routing environment. In response to receiving a network address query with respect to a destination address at a routing device, an aggregate value, e.g. an address prefix, is determined and advertised in reply to the network address query. Determining of the aggregate value may comprise identifying within a range of network addresses represented by the aggregate value respective addresses for which the routing device does not have reachability information. The routing device may send address queries with respect to the identified addresses, to determine reachability via the routing device of those addresses. The aggregate value may be advertised conditional upon determining that a percentage of addresses within the corresponding range that can be reached via the routing device satisfies a predefined minimal coverage value.

19 Claims, 12 Drawing Sheets

(56) References Cited

U.S. PATENT DOCUMENTS

| | | | |
|---|---|---|---|
| 6,505,255 B1 | 1/2003 | Akatsu et al. | |
| RE39,317 E | 10/2006 | Sakagawa | |
| 7,301,945 B1 | 11/2007 | Ooms et al. | |
| 7,333,501 B2 | 2/2008 | Cook et al. | |
| 7,577,141 B2 | 8/2009 | Kamata et al. | |
| 8,121,130 B2 * | 2/2012 | White et al. | 370/395.54 |
| 2001/0051863 A1 | 12/2001 | Razavi et al. | |
| 2005/0076145 A1 | 4/2005 | Ben-Zvi et al. | |
| 2005/0147097 A1 | 7/2005 | Chari et al. | |
| 2005/0175341 A1 | 8/2005 | Ovadia | |
| 2005/0243837 A1 | 11/2005 | Boyd et al. | |
| 2006/0039378 A1 | 2/2006 | Medina et al. | |
| 2006/0106940 A1 | 5/2006 | Jagannathan et al. | |
| 2006/0200539 A1 | 9/2006 | Kappler et al. | |
| 2008/0049717 A1 | 2/2008 | Jamieson et al. | |
| 2009/0013089 A1 | 1/2009 | Sullivan et al. | |
| 2009/0031044 A1 | 1/2009 | Barrack et al. | |
| 2009/0047018 A1 | 2/2009 | Boyd et al. | |
| 2009/0141651 A1 | 6/2009 | White et al. | |

OTHER PUBLICATIONS

U.S. Appl. No. 11/949,561, Non-Final Office Action mailed Oct. 6, 2010, 26 pgs.
U.S. Appl. No. 11/949,561, Examiner Interview Summary mailed Apr. 19, 2011, 3 pgs.
U.S. Appl. No. 11/949,561, Final Office Action mailed Feb. 3, 2011, 35 pgs.
U.S. Appl. No. 11/949,561, Notice of Allowance mailed Oct. 14, 2011, 5 pgs.
U.S. Appl. No. 11/949,561, Response filed Aug. 23, 2010 to Non Final Office Action mailed Jul. 21, 2010, 13 pgs.
U.S. Appl. No. 11/949,561, Response filed Jan. 6, 2011 to Non Final Office Action mailed Oct. 6, 2010, 13 pgs.

* cited by examiner

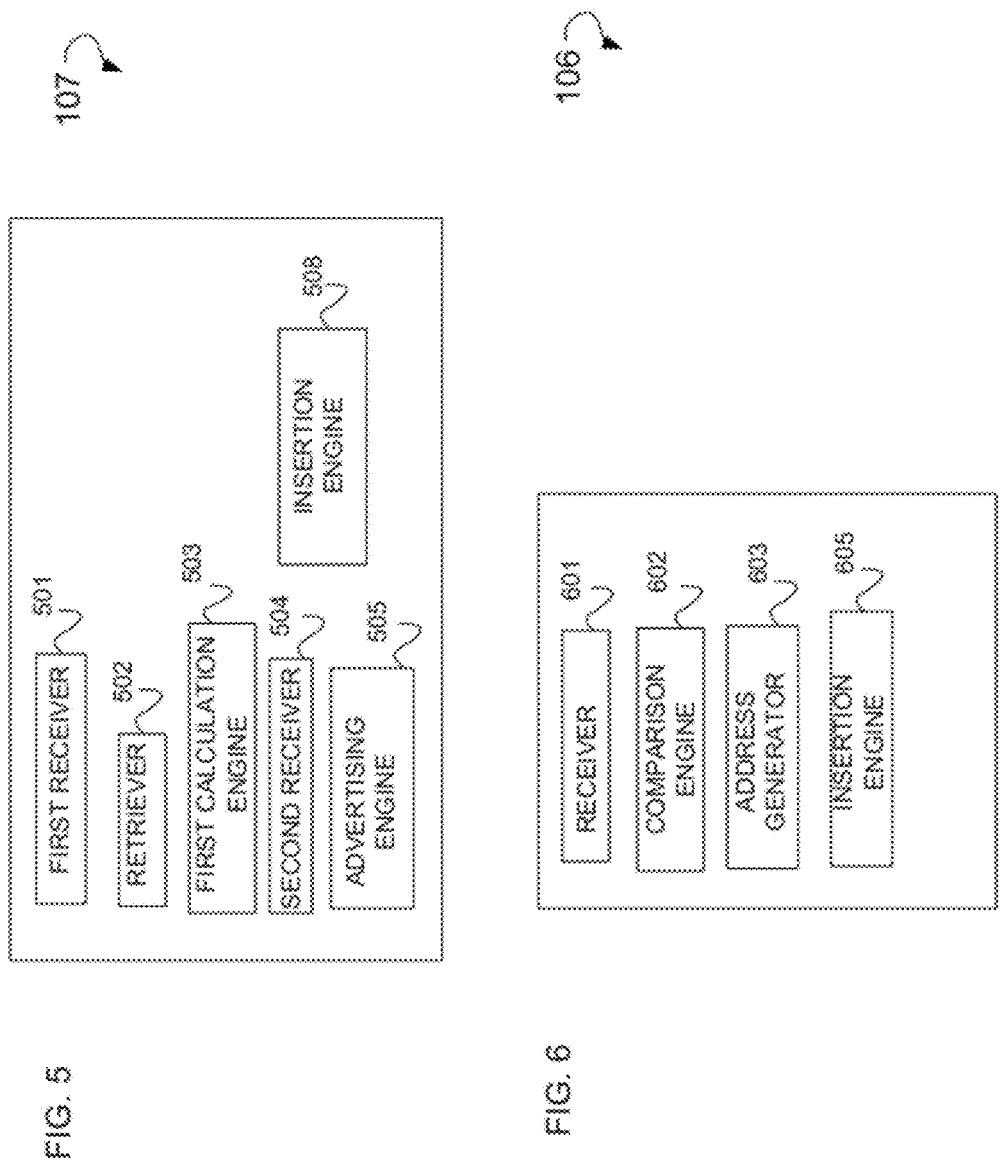

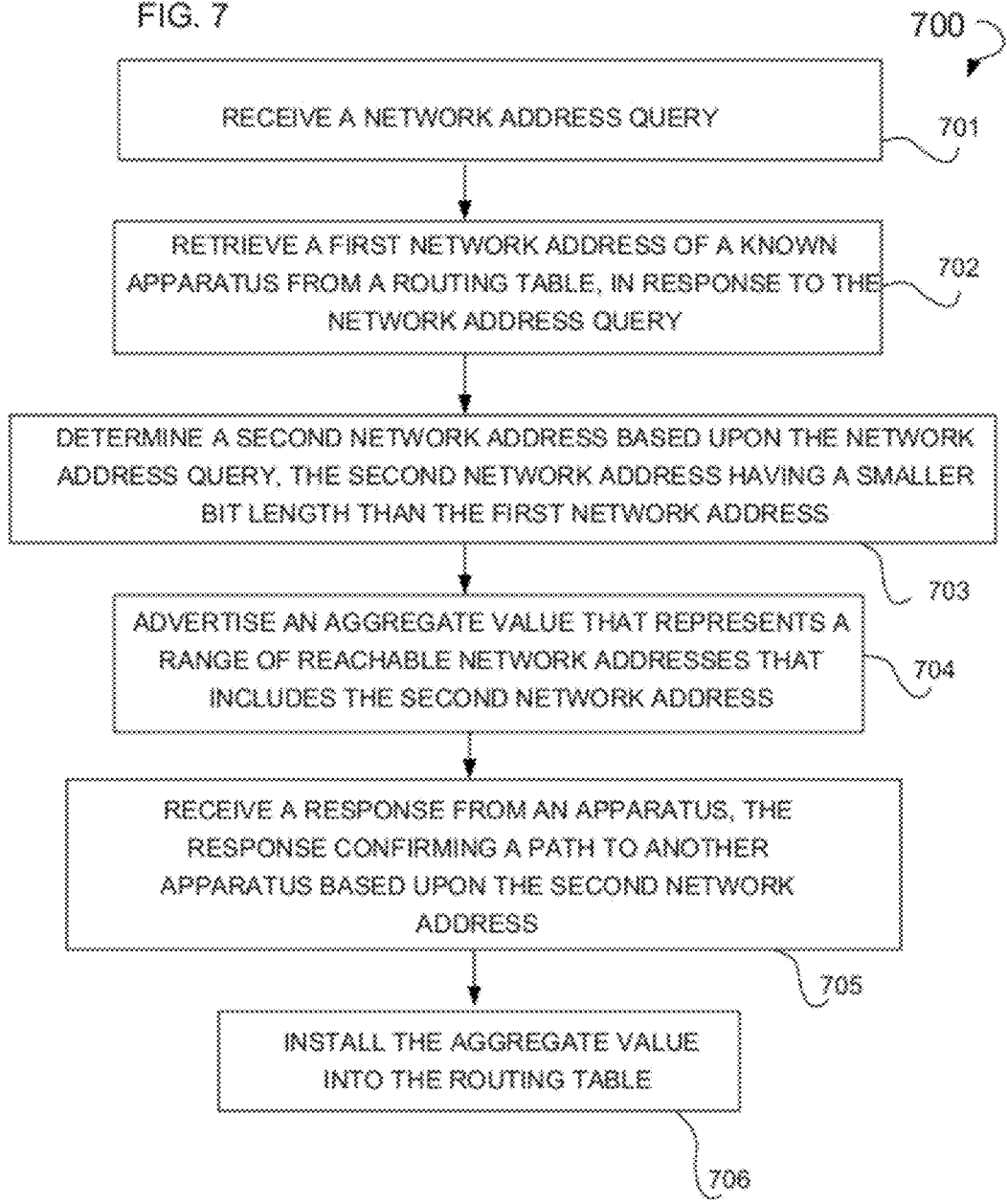

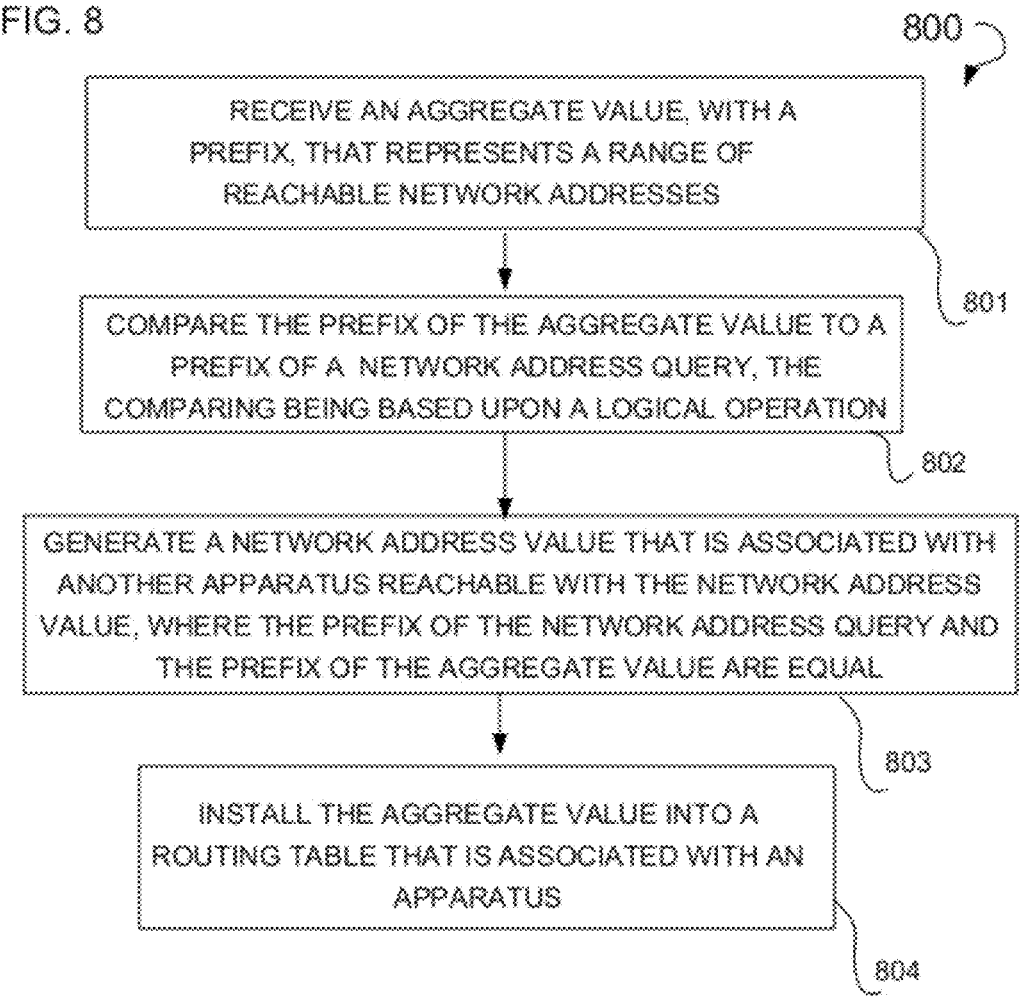

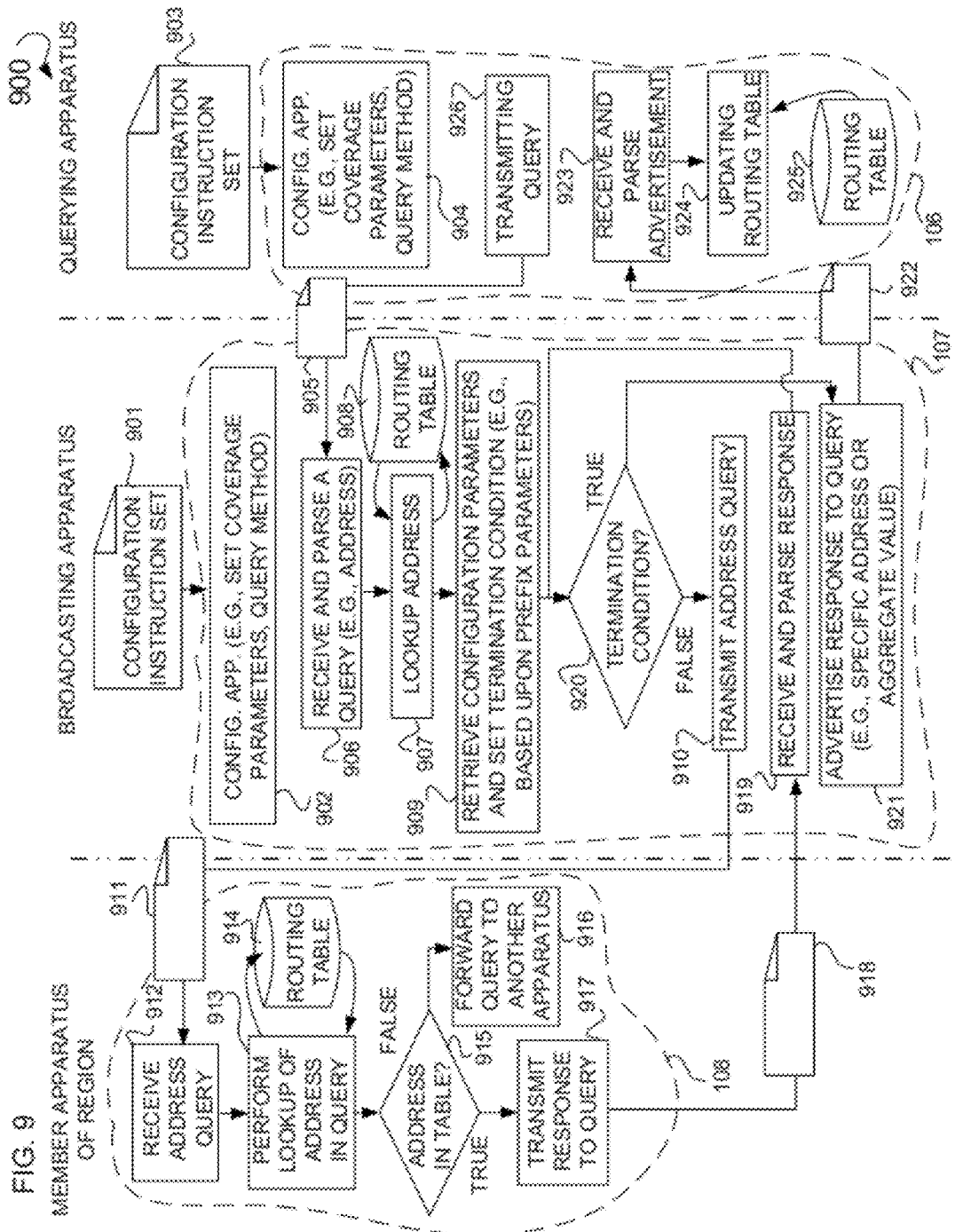

FIG. 10

```
<APPARATUS CONFIGURATION>
  1001 <RETRIEVE ALL ADDRESSES> N </RETRIEVE ALL ADDRESS>
  1002 <SHORTEST PREFIX> 26 </SHORTEST PREFIX>
  1003 <MINIMAL COVERAGE> 100 </MINIMAL COVERAGE>
</APPARATUS CONFIGURATION>
```
903

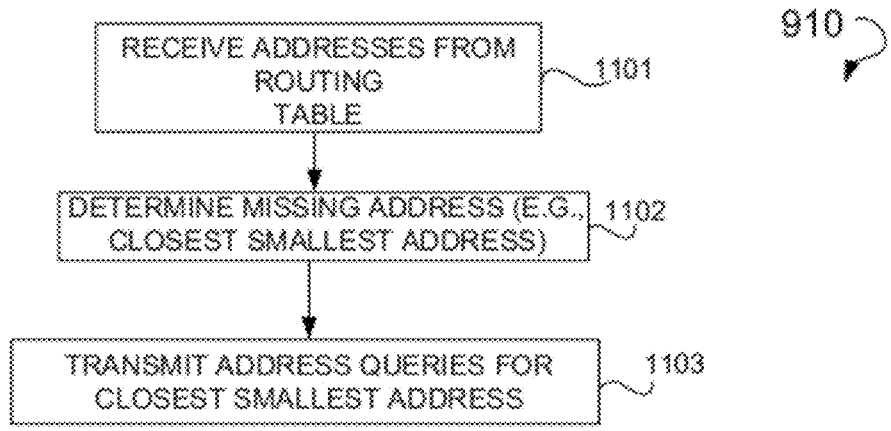

FIG. 11    910

- 1101 RECEIVE ADDRESSES FROM ROUTING TABLE
- 1102 DETERMINE MISSING ADDRESS (E.G., CLOSEST SMALLEST ADDRESS)
- 1103 TRANSMIT ADDRESS QUERIES FOR CLOSEST SMALLEST ADDRESS

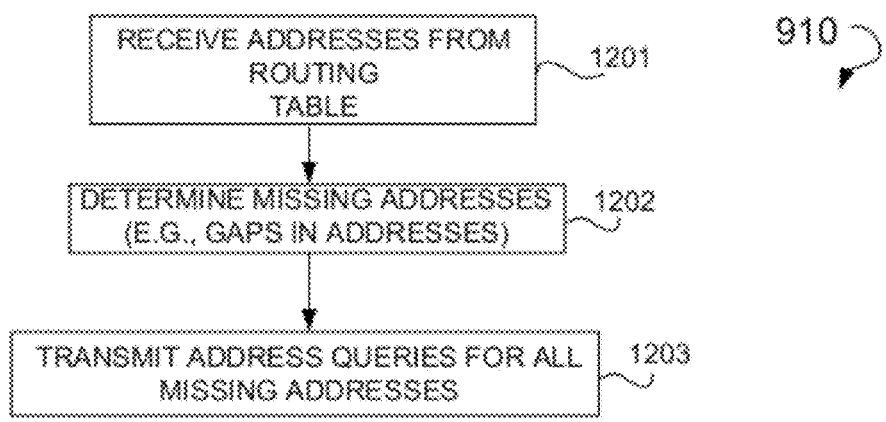

FIG. 12    910

- 1201 RECEIVE ADDRESSES FROM ROUTING TABLE
- 1202 DETERMINE MISSING ADDRESSES (E.G., GAPS IN ADDRESSES)
- 1203 TRANSMIT ADDRESS QUERIES FOR ALL MISSING ADDRESSES

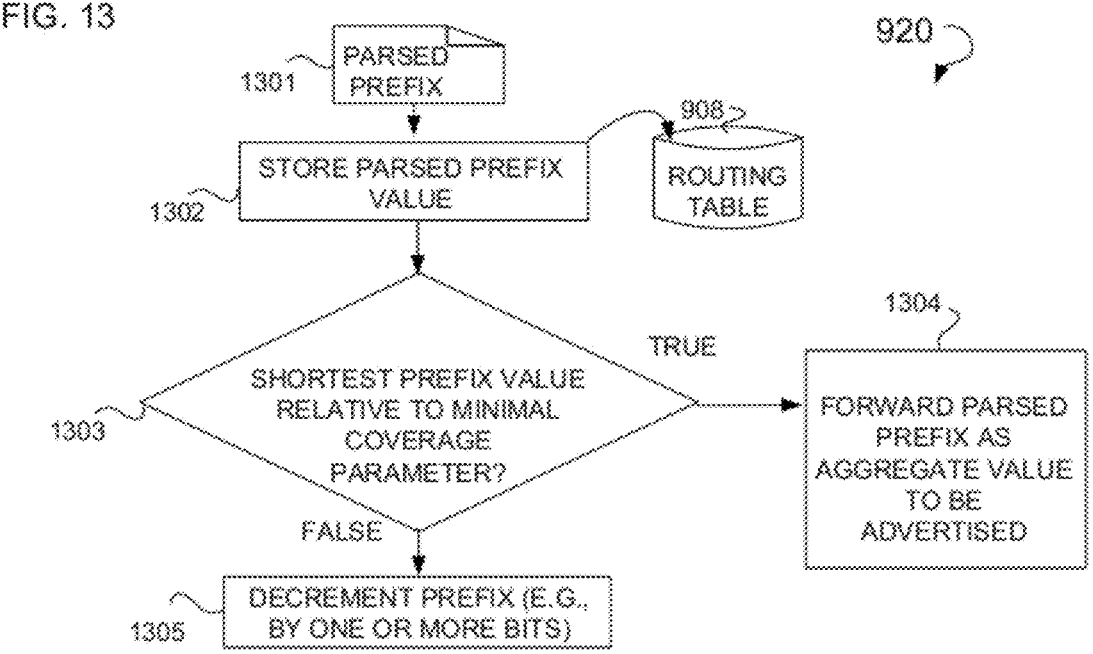

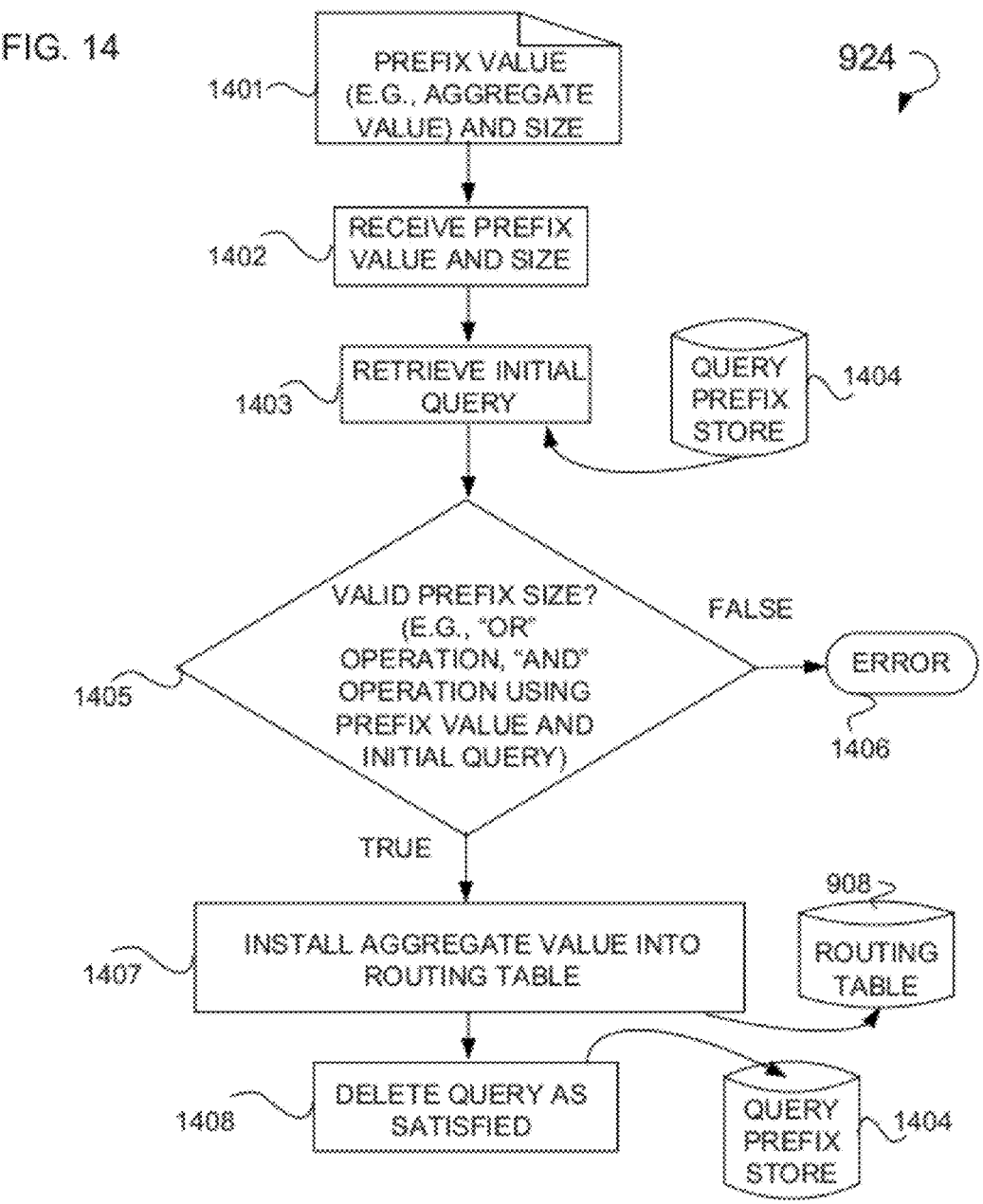

DETERMINING A ROUTE ADVERTISEMENT IN A REACTIVE ROUTING ENVIRONMENT

CLAIM OF PRIORITY

This application is a continuation of and claims the benefit of priority under 35 U.S.C. §120 to U.S. patent application Ser. No. 11/949,561, filed on Dec. 3, 2007, which is hereby incorporated by reference herein in its entirety.

FIELD

This application relates to an apparatus and method for broadcasting a network address in a reactive routing environment.

BACKGROUND

Systems and methods implemented in a reactive routing environment may utilize various protocols and principles, whereby network apparatus (e.g., network node, network device, router, switch, or other network appliance) react to certain broadcast messages. These broadcast messages may include generally the broadcasting of network addresses (e.g., Internet Protocol (IP) addresses), or the request for such addresses. The reactions on the part of the apparatus may range from doing nothing, to broadcasting responses to these messages. In certain examples, the broadcast messages are generated unilaterally and not as part of a reaction on the part of an apparatus.

BRIEF DESCRIPTION OF DRAWINGS

The present method and apparatus is illustrated by way of example and not limitation in the figures of the accompanying drawings, in which like references indicate similar elements and in which:

FIG. 5 is a block diagram of an apparatus, according to an example embodiment, that generates an aggregate value, and some of the various blocks of functionality associated therein.

FIG. 6 is a block diagram of an apparatus, according to an example embodiment, that receives an aggregate value, and some of the various blocks of functionality associated therein.

FIG. 7 is a flow chart illustrating a method, according to an example embodiment, to generate an aggregate value.

FIG. 8 is a flow chart illustrating a method, according to an example embodiment, to generate a range of network addresses form an aggregate value.

FIG. 9 is a tri-stream flowchart illustrating a method, according to an example embodiment, relating to the generation of a query aggregate value and the subsequent generation of a range of network address values based upon the aggregate value.

FIG. 10 is a diagram of a configuration of instruction set, according to an example embodiment.

FIG. 11 is a flowchart illustrating a method, according to an example embodiment, used to implement an operation to find the closest smallest address value.

FIG. 12 is a flowchart illustrating a method, according to an example embodiment, used to implement an operation to determine missing address values in a routing table.

FIG. 13 is a flowchart illustrating a method, according to an example embodiment, used to implement an operation to determine and generate an advertised aggregated value using a termination condition.

FIG. 14 is a flowchart illustrating a method, according to an example embodiment, used to implement an operation that updates a routing table.

DESCRIPTION OF EXAMPLE EMBODIMENTS

Figure 1:
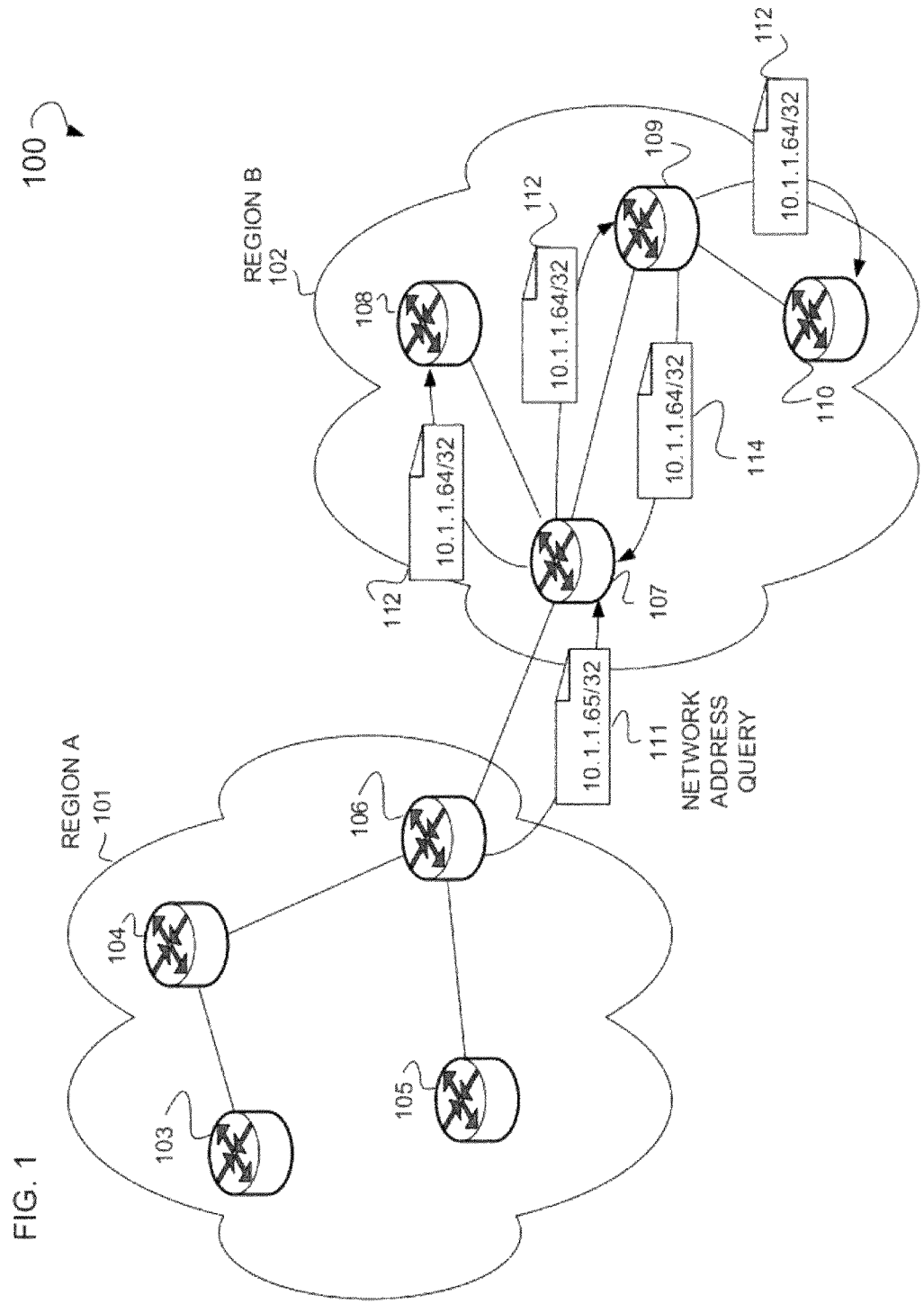
FIG. 1 is a diagram of a system, according to an example embodiment, illustrating the querying of an apparatus in an inter-network context.

In the following description, for purposes of explanation, numerous specific details are set forth in order to provide a thorough understanding of an embodiment of the present method and apparatus. It may be evident, however, to one skilled in the art, that the present method and apparatus may be practiced without these specific details.

Overview

In an example embodiment, a method is provided. In this method, a network address query is received. A first network address of a known apparatus is retrieved from a routing table, in response to the network address query. A second network address may be determined based upon the network address query, the second network address having a smaller bit length than the first network address. An aggregate value may be advertised that represents a range of reachable network addresses, the range of reachable network addresses including the second network address.

Some example embodiments may include a method. This method may include receiving an aggregate value, with a prefix, that represents a range of reachable network addresses. A comparison may take place comparing the prefix of the aggregate value to a prefix of a network address query, the comparing being based upon a logical operation. A network address value may then be generated, where the prefix of the network address query and the prefix of the aggregate value are equal.

Example Embodiments

In some example embodiments, an apparatus and method are illustrated that leverage certain properties of binary numbers in the reactive routing environment to optimize the scalability of a network. This optimization may occur simultaneously with a reduction in the usage of bandwidth during the advertisement of network addresses. These network addresses may be IP addresses, Media Access Control (MAC) addresses, or other suitable network addresses. Further, these network addresses may be illustrated as part of an Open Systems Interconnection Basic Reference (OSI) model, or Transmission Control Protocol/Internet Protocol (TCP/IP) stack model. Some example embodiments may include the use of address masking in combination with a network address. In an example embodiment, an apparatus, which is attempting to advertise an address space that may overlap with other addresses already advertised in the network, uses a method for ensuring that overlapping address spaces are properly tracked. This method uses the capability of querying for reachable destinations available in all reactive routing environments.

For example, when an apparatus receives a query for a specific destination, the apparatus may examine its local routing table, and determine the shortest prefix route which it may reply. The apparatus can then determine the shortest length prefix by comparing the reachable destinations within progressively shorter prefixes against a coverage percentage, which can be referred to as a minimal coverage value. A minimal coverage value may be a value reflecting a percentage of reachable destinations, where each reachable destination is denoted by a network address. When the apparatus finds a possible aggregate value covering a range of reachable network addresses, the apparatus can then send queries requesting information regarding the portions of the address space about which it does not have information. An aggregate value may be a network address stated using a shortened (e.g., stated using 30-bits instead of 32-bits) network address prefix. If the apparatus discovers reachability information for a minimal coverage value, which can be referred to as the "aggregate coverage," the apparatus may advertise an aggregate value, rather than more specific routing information. As an apparatus obtains information about losses in reachability, either through timing routes out, or through newly received routing information, the apparatus can examine the advertised aggregate value. In some examples, routing information may be removed, or otherwise withdrawn. If a specific apparatus no longer has routes to all the components of an advertised aggregate, the apparatus removes the aggregated value, and advertises components of the aggregate value. In some example embodiments, the amount of coverage required may be 100%. That is, an apparatus is able to reach all the destinations within an aggregate value to advertise the aggregate value. It may, however, be possible to envision networks where 100% coverage is not required.

In some example embodiments, certain properties of binary numbers and even logic are utilized to generate the aggregate value. Through applying Classless inter-Domain Routing (CIDR) notation, a network address may be represented as 10.1.1.65/32, where the address 10.1.1.65 is represented as a 32 bit value. In an example, this network address may be joined with a second network address of 10.1.1.64/30 using a logical "AND" operation such that the resulting network address may reveal a range of additional network addresses. This second network address may be an aggregate value. The following is an example of this "AND" operation being applied to the first and second network addresses in their binary form:

$$\text{AND} \frac{\begin{array}{l}1010.1.1 \ldots 1000001\\1010.1.1 \ldots 1000000\end{array}}{1010.1.1 \ldots 1000000}$$

Once this "AND" operation is applied to the first and second network addresses, the resulting value is compared against the first 30 digits of the first network address. Where the values match, a range of address values may be generated based upon the remaining bit positions for which a binary value was not generated. In the present example, the range of address values may be generated for the $31^{st}$ and $32^{nd}$ bit positions such that the following values may be generated:
10.1.1.6432 as 1010.1.1 . . . 1000000

10.1.1.65/32 as 1010.1.1 . . . 1000001
10.1.1.66/30 as 1010.1.1 . . . 1000010
10.1.1.67/30 as 1010.1.1 . . . 1000011

As illustrated above, these ranges of address values created by comparing the query address and the aggregate value allow the first apparatus to learn the network addresses reachable by the second apparatus, without having to be provided each of these addresses separately. Further, rather than having to be provided a 32-bit value as a response to the query, the first apparatus can be provided a smaller network address as an aggregate value that still covers a range of addresses. A smaller network address may be a network address that is 30-bits long instead of 32-bits long. Some example embodiments may include using less bandwidth, for rather than having to transmit a plurality of address in response to an initial query, a single aggregate value may be transmitted. Further, through comparing the query address and the aggregate value, optimal routing table sizes may be generated and used, black holes in a network may be avoided, and topology dependence may be avoided.

In an example implementation, assume a single apparatus in a reactive network has a routing table including the following network addresses:
10.1.1.65/32
10.1.1.66/32
10.1.1.68/32
10.1.1.70/32

The apparatus receives a query for routing information for 10.1.1.65, in response to the query, the apparatus examines its local routing table, and discovers it has a route to 10.1.1.65/32 that would provide reachability to this destination (e.g., 10.1.1.65/32). Rather than answering with this route, however, the apparatus examines the adjoining routing table entries, to determine if a shorter prefix may be advertised. The apparatus first determines that if the apparatus could find reachability to 10.1.1.64/32, then the apparatus could advertise 10.1.1.64/31, which would include the addresses 10.1.1.64 and 10.1.1.65. Next, the apparatus sends out a query, and receives a reply that 10.1.1.64/32 is reachable through some connected interface. If the apparatus could reach 10.1.1.67/32, then the apparatus could advertise 10.1.1.64/30 as an aggregate value. By advertising 10.1.1.64, the apparatus could in effect advertise addresses 10.1.1.64 through 10.1.1.67. Again, the apparatus sends out a query, and finds a path to 10.1.1.67. If the apparatus could find reachability to 10.1.1.69 and 10.1.1.71, then the apparatus could advertise 10.1.1.64/29 as an aggregate value. This address 10.1.1.64/29 may include addresses 10.1.1.64 through 10.1.1.71. The apparatus then queries for reachability to 10.1.1.69, and if the apparatus does not receive a reply, then the apparatus advertises 10.1.1.64/30 as an aggregate value.

In some example embodiments, the above illustrated implementation may also include the ability to not attempt to advertise a shorter prefix length route. For instance, if less than sonic percentage of the address space is already known, or the advertised prefix length is already below some length, the apparatus may choose to simply advertise the route as known. Further, the process used may vary from a "recursive" or "cyclical" process, as illustrated above, to a process where queries for all the missing address space are all sent at once. In examples where all address space information is requested at once, a particular aggregate value may be advertised when the queries have been completed.

FIG. 1 is a diagram of an example system 100 illustrating the querying of an apparatus in an inter-network context. Illustrated is a Region A 101 that includes a number of apparatuses such as apparatuses 103-106. These apparatuses may be, for example, routers, bridges, switches, or some other suitable network appliance. Illustrated herein is an apparatus 103 that is operatively coupled to an apparatus 104. This apparatus 104 is, in turn, operatively coupled to an apparatus 106, which is operatively coupled to an apparatus 105. As illustrated here, apparatus 106 operates as, for example, a gateway apparatus. Also illustrated is a Region B 102 that includes a number of apparatuses such as apparatuses 107-110, included within this Region B 102 are a number of apparatuses, including, for example, apparatus 110, apparatus 109, apparatus 108, and apparatus 107. Apparatus 107, in this example, may act as a second gateway apparatus. Further, apparatus 107 is operatively coupled to apparatus 108 and apparatus 109, whereas apparatus 109 is operatively coupled to apparatus 110. Further, apparatus 107 is operatively coupled to apparatus 106. Additionally, FIG. 1 shows a network address query 111 that is generated and sent by the apparatus 106 across a network connection to the apparatus 107. A network address query may be a data packet broadcast by an apparatus seeking network address information. Included within this network address query 111 is a network address (e.g., a query address) of 10.1.1.65/32. Once this network address query 111 is received by the apparatus 107, apparatus 107 examines its routing table and determines any gaps or missing values in this routing table.

Based upon the discovery of gaps in the routing table, the apparatus 107, in turn, sends out additional queries 112, and 114 to the apparatus to which the apparatus 107 is operatively connected (e.g., apparatus 108, apparatus 109). Here, for example, included within each one of these queries 112 is a network address 10.1.1.64, which is a number one less than the original network address query 111. Specifically, whereas network address query 111 seeks information with regard to the address 10.1.1.65 as a 32-bit value, apparatus 107 seeks information with regard to 10.1.1.64 as a 32-bit value. As will be illustrated below, this process of sending out queries to fill the gaps in routing table of apparatus 107 may continue until a termination condition is met, such as when no response is received from the apparatuses (e.g., apparatus 108 and apparatus 109) to which apparatus 107 is operatively connected. In the alternative, this process may continue until queries are sent out for a range of network addresses predetermined by the apparatus 107, and responses are received or not received in reply. Still further, an empty reply packet may be received from the apparatuses (e.g., apparatus 108 and apparatus 109) denoting that no further address information is available. Collectively, apparatuses 103 through 110 may be a network node, network device, router, switch, or other suitable network appliance.

Figure 2:
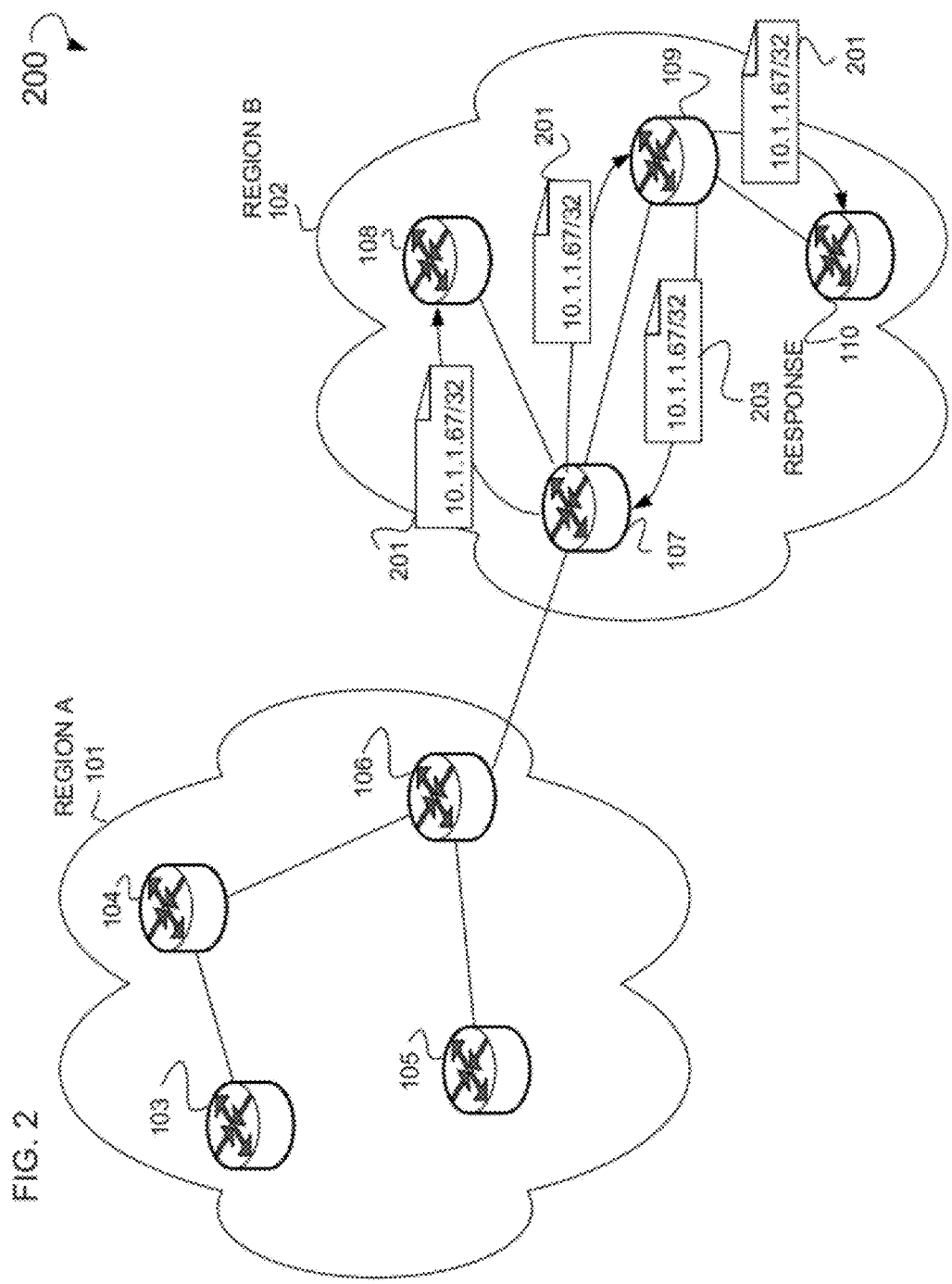
FIG. 2 is a diagram of a system, according to an example embodiment, illustrating a subsequent query by a second apparatus in response to a query provided by a first apparatus.

FIG. 2 is a diagram of an example system 200 illustrating a subsequent query by the previously illustrated apparatus 107 in response to the network address query 111. FIG. 2 shows the apparatus 107 and a plurality of queries 201. In some example embodiments, the apparatus 107 conducts an additional query of the apparatuses to which the apparatus 107 is operatively connected. Here, for example, queries 201 including the query address 10.1.1.67 are sent to apparatus 108 and apparatus 109. In turn, apparatus 109 returns a response 203 including the query address 10.1.1.67. Based upon this response 203, apparatus 107 may send a response to the apparatus 106 responding to the network address query 111. This response may include, for example, the value 10.1.1.64 as a 30-bit value such that this 30-bit value (e.g., 10.1.1.64/30 as 10.1.1 ... 10000) could be an aggregate value. This aggregate value may then be processed by the apparatus 106 such that the values 10.1.1.64/32 through 10.1.1.67/32 may be retrieved on an as-needed basis. Further, in some examples, query 205 is sent from the apparatus 109 to the apparatus 110. As will be more fully shown below, however, based upon certain parameters regarding coverage percentage and bit size, the apparatus 107 may make additional queries of the apparatus that are part of its Region B 102. Specifically, apparatus 107 may query apparatus 109, and apparatus 109 may query apparatus 110. This process, in some example embodiments, may continue until no further apparatuses may be queried.

Figure 3:
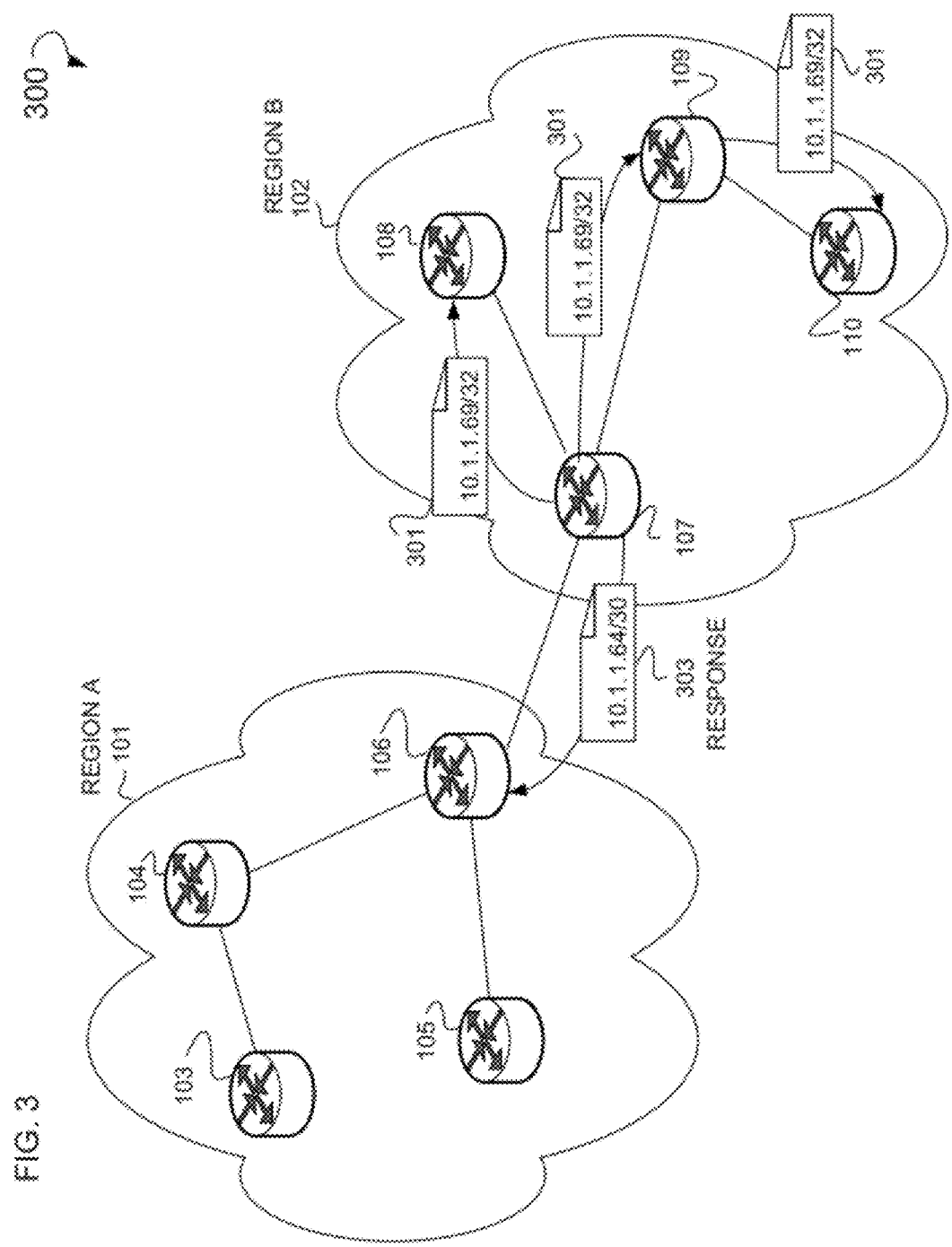
FIG. 3 is a diagram of a system, according to an example embodiment, illustrating a response provided by the first apparatus to the second apparatus as a response to an initial query generated by the first apparatus.

FIG. 3 is a diagram of an example system 300 illustrating a response 303 provided by the apparatus 107 to the apparatus 106 in response to the network address query 111. FIG. 3 shows an apparatus 107, a query 301 and a response 303. In some example embodiments, an apparatus 107 generates a query 301 that includes the address 10.1.1.69. This query 301 is made, for example, because a gap may exist in the routing table values included in the routing table for apparatus 107. Here, however, neither one of the queried apparatuses (e.g., apparatus 108 and apparatus 109) respond to the queries sent out by apparatus 107 (e.g., query 301). Apparatus 107 then generates a response 303 including the aggregate value 10.1.1.64 as a 30-bit value (10.1.1.64/30). This 30-bit value, as previously shown above and in FIG. 2, includes an aggregate value that can be utilized by the apparatus 106 to generate a range of network address values 10.1.1.64 through 10.1.1.67 as 32-bit values. Apparatus 106 will then have network addresses for not only the initial query address 10.1.1.65, but also for the network addresses 10.1.1.64 through 10.1.1.67.

Figure 4:
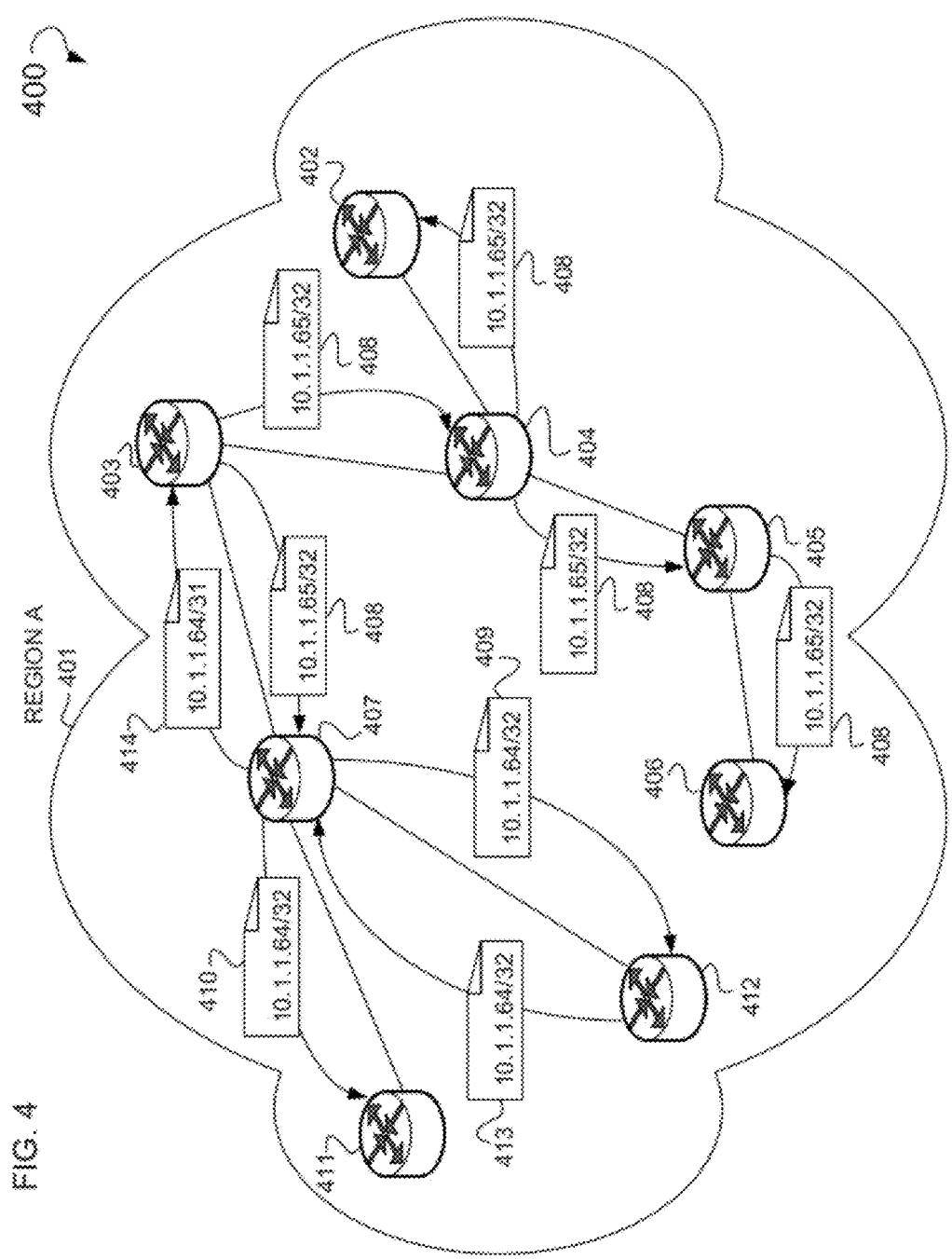
FIG. 4 is a diagram of a system, according to an example embodiment, illustrating the generation of an aggregate value within the intra network context.

FIG. 4 is a diagram of an example system 400 illustrating the generation of an aggregate value within the intra-network context. Illustrated is a Region A 401 including a number of apparatuses 403-407, and apparatuses 411-412, and various network address queries 408. As with FIGS. 1 through 3, these apparatuses may be, for example, a router, bridge, switch, or some other suitable network appliance. In some example embodiments, an apparatus 403 is operatively connected to an apparatus 404. This apparatus 404 is, in turn, operatively connected to apparatuses 402 and 405. Apparatus 405 is operatively connected to apparatus 406. Further illustrated is an apparatus 407 that is operatively connected to the apparatus 403. This apparatus 407 is also operatively connected to apparatuses 412 and 411. In some example embodiments, apparatus 403 generates a query network address query 408 including the query address 10.1.1.65 as a 32-bit value. In some example embodiments, this network address query 408 may be transmitted to other apparatuses as well (e.g., apparatus 404), and forwarded by these apparatuses (e.g., apparatus 404 forwarding to apparatus 402, and apparatus 405 forwarding to apparatus 406). Once received by the apparatus 407, this network address query 408 is processed such that its address information is retrieved, and such that the apparatus 407 generates additional queries 409 and 410 that are sent to apparatuses 411, and 412 respectively. These additional queries 409 and 410 may be generated because a gap exists in the routing table for the apparatus 407. In response to the query 409, apparatus 412 may generate a response 413 including the address value 10.1.1.64. Once this response 413 is received by the apparatus 407, apparatus 407 may generate a response to the network address query 408 in the form of a response 414 including the aggregate value 10.1.1.64 as a 31-bit value. This response 414 is then processed such that the value 10.1.1.64 as a 31-bit value is placed into the routing table for apparatus 403 and, as a result, both 10.1.1.64 and 10.1.65 as a 32-bit value may be generated from the aggregate value included within the response 414. The process for taking an aggregate value and using the aggregate value to generate a number of additional address values will be more fully illustrated below.

FIG. 5 is a block diagram of an example apparatus such as the apparatus 107 and some of the various blocks of functionality associated therewith. These blocks may represent blocks of functionality implemented in hardware, firmware, or even software. As shown in FIG. 5, apparatus 107 includes a first receiver 501, a retriever 502, a first calculation engine 503, and a second receiver 504. Some example embodiments may include the apparatus 107 having a first receiver 501 to receive a network address query. The apparatus 107 also includes retriever 502 to retrieve a first network address of a known apparatus from a routing table, this in response to the network address query. A first network address may be an IP address or some other suitable network address. A known apparatus may be an apparatus whose network address is listed in the routing table. Moreover, the apparatus 107 has a first calculation engine 503 to determine a second network address based upon the network address query, where the second network address has a smaller bit length than the first network address. Additionally, the apparatus 107 has an advertising engine 504 to advertise an aggregate value that represents a range of reachable network addresses including the second network address. A reachable network address may be a network address of a further apparatus, where the further apparatus may be reached with data. In addition, the first calculation engine 503 may determine the second network address by a recursive operation performed on the first network address. Further, first calculation engine 503 may determine the second network address based upon a minimal coverage value. Also, the apparatus 107 may have a second receiver 505 that may receive a response from a further apparatus, the response confirming a path to another apparatus based upon the second network address. Additionally, the aggregate value may be a smaller bit length than the network query address query. Moreover, an insertion engine 506 is shown to install the aggregate value into the routing table.

FIG. 6 is a block diagram of an example apparatus such as the apparatus 106 and some of the various blocks of functionality associated therewith. These blocks may represent blocks of functionality implemented in hardware, firmware, or even software. As shown in FIG. 6, apparatus 106 includes receiver 601, comparison engine 602, address generator 603, and insertion engine 604. Receiver 601 is configured to receive an aggregate value, with a prefix, that represents a range of reachable network addresses. Also, comparison engine 602 compares the prefix of the aggregate value to a prefix of a network address query, wherein the comparison is based upon a logical operation. Additionally included is an address generator 603 to generate a network address value, where the prefix of the network address query and the prefix of the aggregate value are equal. This address generator 603 may generate the network address value based upon a minimal coverage value. Further, this address generator 603 may generate the network address value through finding an address value that lies between the aggregate value and the network address query. Also, this apparatus 106 may include an insertion engine 604 to install the aggregate value into a routing table that is associated with the apparatus.

FIG. 7 is a flow chart illustrating an example method 700 to generate an aggregate value. The various operations 701-706 shown below may reside as part of the apparatus 107. Shown is a method that includes executing an operation 701 for receiving a network address query. Next, an operation 702 is shown that, when executed, retrieves a first network address of a known apparatus from a routing table, in response to the network address query. Then, an operation 703 is executed to determine a second network address based upon the network address query, the second network address having a smaller bit length than the first network address. Operation 704 may be executed to advertise an aggregate value that represents a range of reachable network addresses including the second network address. The operation 703 may also be executed to determine the second network address is performed by a recursive operation on the first network address. Also, this operation 703 may also be executed to determine whether the second network address is based upon a minimal coverage value. An operation 705 may be executed to receive a response from an apparatus, where the response confirms a path to another apparatus based upon the second network address. The aggregate value may be a smaller bit length than the network query address query. An operation 706 may be executed to install the aggregate value into the routing table.

FIG. 8 is a flow chart illustrating an example method 800 to generate a range of network addresses from an aggregate value. The various operations 801-804 shown below may reside as a part of the apparatus 106. Shown is an operation 801 that, when executed, receives an aggregate value, with a prefix, that represents a range of reachable network addresses. Next, an operation 802 is illustrated that when executed, compares the prefix of the aggregate value to a prefix of a network address query, where the comparing is based upon a logical operation. Further, an operation 803 is shown that, when executed, generates a network address value, where the prefix of the network address query and the prefix of the aggregate value are equal. Moreover, this operation 803 may generate the network address value based upon a minimal coverage value. Also, this operation 803 may generate the network address value that is performed through finding an address value that lies between the aggregate value and the network address query. An operation 804 is shown that, when executed, installs the aggregate value into a routing table that is associated with an apparatus. Below is illustrated a number of figures that provide a context for understanding the operations shown in FIGS. 7 and 8.

FIG. 9 is a tri-stream flowchart illustrating an example method 900 relating to the generation of an aggregate value and the subsequent generation of a range of network address values based upon the aggregate value. In some example embodiments, the functionality outlined below in the form of the various operations may reside on the same of the apparatuses e.g., apparatus 106, apparatus 107, or apparatus 108), as opposed to being divided amongst two or more apparatuses as illustrated here. Shown is a first stream titled "Member of Apparatus Region" illustrating operations 912-913, 915-917, and a routing table 914. Also shown is a second stream titled "Broadcasting Apparatus" illustrating operations 902, 906-907, 909-910, 919-921, and a routing table 908. A third stream titled "Querying Apparatus" is also shown that illustrates operations 90.4, 923-92.4, 926, and routing table 925.

Starting with the "Broadcasting Apparatus" stream, a configuration instruction set 901 is provided to, and processed by an operation 902. This configuration instruction set 901 configures a broadcasting apparatus, wherein this broadcasting apparatus may be, for example, one of the previously illustrated gateway apparatus 107. Further, with regard to the stream titled "Querying Apparatus," a similar configuration instruction set 903 is provided to the querying apparatus which may be, for example, the previously illustrated apparatus 106. This configuration instructions set 903 is processed through the execution of an operation 904, such that an apparatus (e.g., apparatus 106) may have certain coverage parameters and query methods that are set for the apparatus. Similarly, through the execution of operation 902, the broadcasting apparatus (e.g., apparatus 107) may have certain coverage parameters and query method set for the apparatus. Once the configuration instructions are provided to the broadcasting apparatus (e.g., apparatus 107) and the querying apparatus (e.g., apparatus 106), the querying apparatus may be then generate a query such as network address query 111.

Further, illustrated is a transmit query operation 926 which, when executed, generates a query 905. This query 905 may be akin to, for example, the network address query 111. Once generated, this query 905 is received by the broadcasting apparatus through the execution of an operation 906. When executed, the operation 906 extracts a network address with regard to which the query is made. This network address is then provided to an operation 907 that looks up the address in a routing table 908. Once look up occurs, a further operation 909 is executed that retrieves configuration parameters and sets various termination conditions based upon the configuration instructions 901. Next, a decisional operation 920 is executed that determines whether or not certain termination conditions have been met, and determines a second network address based upon the network address query. These termination conditions may include meeting a certain minimal coverage value relative to a prefix value such that certain gaps in the addresses listed in the routing table 908 are filled. In other examples, an empty packet, anon-response, or some other suitable condition may form the basis of a termination condition.

In examples where decisional operation 920 evaluates to "false," an operation 910 is executed. When executed, the operation 910 transmits an address query to the various apparatuses that are operatively connected to, for example, the apparatus 107. These apparatus may include, for example, the previously illustrated apparatus 108, and/or apparatus 109. This address query generated by the execution of operation 910 may be in the form of, for example, an network address query 911 that may be akin to, for example, the previously shown network address queries 112. The network address in query 911 is then received through the execution of an operation 912 residing as part of one of the apparatus e.g., an apparatus 108) operatively connected to the apparatus 107. The operation 912 extracts the address included within the network address query 911, and an operation 913 is executed that performs a look up in a routing table 914 residing on the apparatus. Next, a decisional operation 915 is executed that determines whether or not the network address is in the routing table 914. If decisional operation 915 evaluates to "false," then no further operations are executed on the apparatus, and an operation 916 is executed that forwards the query 911 onto another apparatus. The execution of operation 916 is reflected in, for example, the forwarding of a query from one apparatus to another (see e.g., query 201 being forwarded from an apparatus 107 to apparatus 109, and then again from an apparatus 109 to an apparatus 110). In examples where decisional operation 915 evaluates to "true," a further operation 917 is executed that transmits a response 918 to the network address query 911. In some example embodiments, the response 918 may be akin to, for example, the previously illustrated response 114. This response 918 is then received through the execution of an operation 919 that receives this response 918 and parses the response 918 to determine the address. In some example embodiments, this operation 919 may store (not pictured) the address parsed from the response 918 into the routing table 908. Once the response 918 is parsed, the decisional operation 920 is re-executed and the existence of a termination condition is determined. In certain examples, the response 918 includes an empty packet denoting that no further address information is available, thus constituting a termination condition. In other examples, no response may be received thus constituting a termination condition.

In examples where decisional operation 920 evaluates to "true," then a further operation 921 is executed that advertises a response 922 to the initial query 905, wherein this response 922 includes an aggregate value. This response 922 is akin to previously illustrated response 303. This response 922 is received through the execution of an operation 923 that resides on the querying apparatus. This operation 923 not only receives the response 922, but extracts the now shortened network address value (e.g., the aggregate value). Next, an operation 924 is executed that updates a routing table 925. This updating process, which will be more fully shown below, takes this aggregate value, compares the aggregate value to the initial query value included in query 905, and then installs the initial query value in the routing table 925.

FIG. 10 is a diagram of an example configuration instruction set 903. Illustrated in FIG. 10 is a configuration of instruction set 903 which may be written in, for example, an eXtensibie Markup Language (XML) or, for example, as a flat file delimited with some character value, or embedded in the apparatus. Here, the configuration instruction set 903 is written in XML, and includes a number of fields. These fields include, for example, a field 1001 that includes a boolean value as to whether or not all missing addresses in a routing table should be broadcast at once. Here, this value is set to "no." Next, a field 1002 is illustrated including a shortest prefix length value which here is 26. The shortest prefix length value may reference, for example, a shortest prefix in terms of the shortest number of prefix bits that may be returned in response to an initial query such as network address query 111. For example, in the network address query 111, the returned address value (e.g., response 303) may have a prefix which may be no shorter than 26 bits. Further, illustrated is a field 1003 that includes a minimal coverage value, which here is set to 100. In some examples, a minimum percentage coverage value may be provided to an apparatus such that the range of network values generated using the aggregate value may be, for example, 100%. By way of illustration, in the previously discussed example response 303 including the aggregate value 10.1.1.64/30, assuming a coverage value set to 100%, means that address values 10.1.1.64 through 10.1.1.67 may be reachable through the apparatus 107. If, however, a minimal coverage value was set to 50% then the values 10.1.1.64 through 10.1.1.65 would have to be reachable through the apparatus 107. The concept of minimal coverage value will be more fully shown and illustrated below.

FIG. 11 is a flowchart illustrating an example method used to implement operation 1110. Shown are various operations 1101-1103. In some example embodiments, an operation 1101 receives addresses from a routing table. Once received, an operation 1102 is executed that determines a missing address, where the missing address may be the smallest and closest address (e.g., having the closest value) to the received address, or addresses. For example, if an initial query such a network address query 111 seeks address information with regard to the address 10.1.1.65, then the next smallest address would be for example 10.1.1.64. This address is both the closest value and this address may be missing from the routing table associated with apparatus 107. Once this next closest and smallest address are determined, an operation 1103 is executed that transmits an address query to an apparatus operatively connected to the apparatus upon which operation

1110 resides. This transmitted address query may be akin to, for example, the previously illustrated query 112, 201, 301, 409, or 410.

FIG. 12 is a flowchart illustrating an example method used to implement operation 910. Shown are various operations 1201-1203. Some example embodiments may include an operation 1201 that receives addresses from a muting table. Once received, an operation 1202 is executed that determines missing addresses, or, in some examples, gaps in the received addresses. For example, if the address 10.1.1.65 is received, and a second address of 10.1.1.70 is received, then a gap would exist between these two values such that the values 10.1.1.66 through 10.1.1.69 would be unknown. These unknown values would then, in some examples, need to be determined. Once operation 1202 is executed, operation 1202 determines what gaps exist in the addresses that are received from the routing table. An operation 1203 is then executed that transmits an address query for all these missing addresses. This address query may be similar to, for example, the address query 911, or even the various address queries previously shown in FIGS. 1 through 4 (e.g., address query 112, 201, 301, 409, and 410).

FIG. 13 is a flowchart illustrating an example method used to execute operation 920. Shown are various operations 1301-4305. Illustrated is a parsed prefix 1301 that is received and processed through the execution of an operation 1302 that stores the parsed prefix 1301 into the routing table 908. Next, a decisional operation 1303 is executed. This decisional operation 1303 determines a shortest prefix value relative to a minimal coverage value (e.g., a minimal coverage parameter). In certain examples, decisional operation 1303 may be recursive or iterative in nature wherein the termination condition may be the lack of a response by an apparatus to, for example, the address query 911, or even address queries 112, 201, 301, 409, and 410. In certain examples, the receipt of an empty packet may form the basis for termination. In some examples, decisional operation 1302 may terminate where a shortest prefix length value is met (see e.g., shortest prefix value 802). Further, the termination condition may be met where a minimal coverage parameter is met. In examples where the decisional operation evaluates to "true," then an operation 1304 is executed that forwards the parsed prefix as an aggregate value to be advertised (see e.g., response 303, response 414, and response 922). The aggregate value generated using the decrementing operation is illustrated below, and may include less than or equal to the number of bits used to make up the initial address query (e.g., network address query 111, or query 905). In examples where decisional operation 1303 evaluates to "false" (e.g., the shortest prefix value relative to the minimal coverage parameter has not been discovered), then an operation 1305 is executed that decrements the parsed prefix value 1301 by one or more bits. This operation 1305, in effect, generates a further network address based upon a network address query.

The concept of a minimal coverage value may be illustrated in the following example. A coverage parameter of 100% requires that all address values for a given range of address values must be discovered. Discovery may occur as a result of the generation of queries and responses shown in, for example, FIG. 9. If the range of address values is between 10.1.1.64/32, and 10.1.1.67/32 inclusive, then these and all intervening address values (e.g., 10.1.1.65/32, and 10.1.1.66/32) would need to be discovered. If only two of the addresses were discovered, then a 50% coverage parameter would be realized. If only three of the addresses were discovered, then a 75% coverage parameter would be realized. As previously alluded to a termination condition may be, for example, when the coverage percentage rises to the level of 100%.

FIG. 14 is a flowchart illustrating an example method used to execute operation 924. Shown are various operations 1402-1403, 1405-1408, and a query prefix store 1404. Illustrated in FIG. 14 is a prefix value and size data packet 1401, where this prefix value may be, for example, the previously illustrated aggregate value. This data packet 1401 is provided to and retrieved by an execution of operation 1402. In some examples, this data packet 201 may include some type of binary value. Next, an operation 1403 is executed that retrieves the initial query from a query prefix store 1404. This initial query may be, for example, the network address query 111, or even the network address query 408. Once this initial query is retrieved, a decisional operation 1405 is executed that determines whether the prefix size is valid. In some example embodiments, the initial query, and value included therein, is compared to the aggregate value using some type of logical operation such as a logical AND operation. A valid prefix size may exist where through the utilization of this logical AND operation, the initial query value, or a prefix associated with the initial query value, is returned. In examples where decisional operation 1405 evaluates to "false," an error condition 1406 is executed. In examples where decisional operation 1405 evaluates to "true," then an operation 1407 is executed. Decisional operation 1405 may evaluate to "true", where, for example, the aggregate value, and prefix associated therewith, corresponds to the initial query value. This operation 1407 installs an aggregate value into a routing table such as routine table 908. Next, an operation 1408 is executed that deletes the record of the initial query from the query prefix store 1404.

Some example embodiments may utilize the OSI model, or TCP/IP stack model for defining the protocols used by a network to transmit data. In applying these models, a system of data transmission between a server and client, or between peer computer systems, is illustrated as a series of approximately five layers comprising: an application layer, a transport layer, a network layer, a data link layer, and a physical layer. In examples of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data toad field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, Local Area Network (LAN), Wide Area Network (WAN), or some other suitable network. In some examples, Internet refers to a network of interconnected computer networks. These networks may use a vane of protocols for the exchange of data, including the aforementioned TCP/IP, and additionally ATM, SNA, SDI, or some other suitable protocol. These networks may be organized within a variety of topologies (e.g., a star topology), or structures.

In some example embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data that cause a general-purpose computer system or special-purpose computer system to perform a certain function or group of functions. The computer-executable or computer-readable instructions may be, for example, binaries, or intermediate format instructions such as assembly language, or even source code.

As shown herein, and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or PDA) where internal modules (e.g., a processor and memory) work together to perform operations on electronic data.

In some example embodiments, the method and apparatus may be practiced in network computing environments with many types of computer system configurations, including hubs, routers, wireless Access Points (APs), wireless stations, personal computers, laptop computers, hand-held devices, multi-processor systems, microprocessor-based or programmable consumer electronics, network PCs, minicomputers, mainframe computers, mobile telephones, PDAs, pagers, and the like. The method and apparatus can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices (see below).

Figure 15:
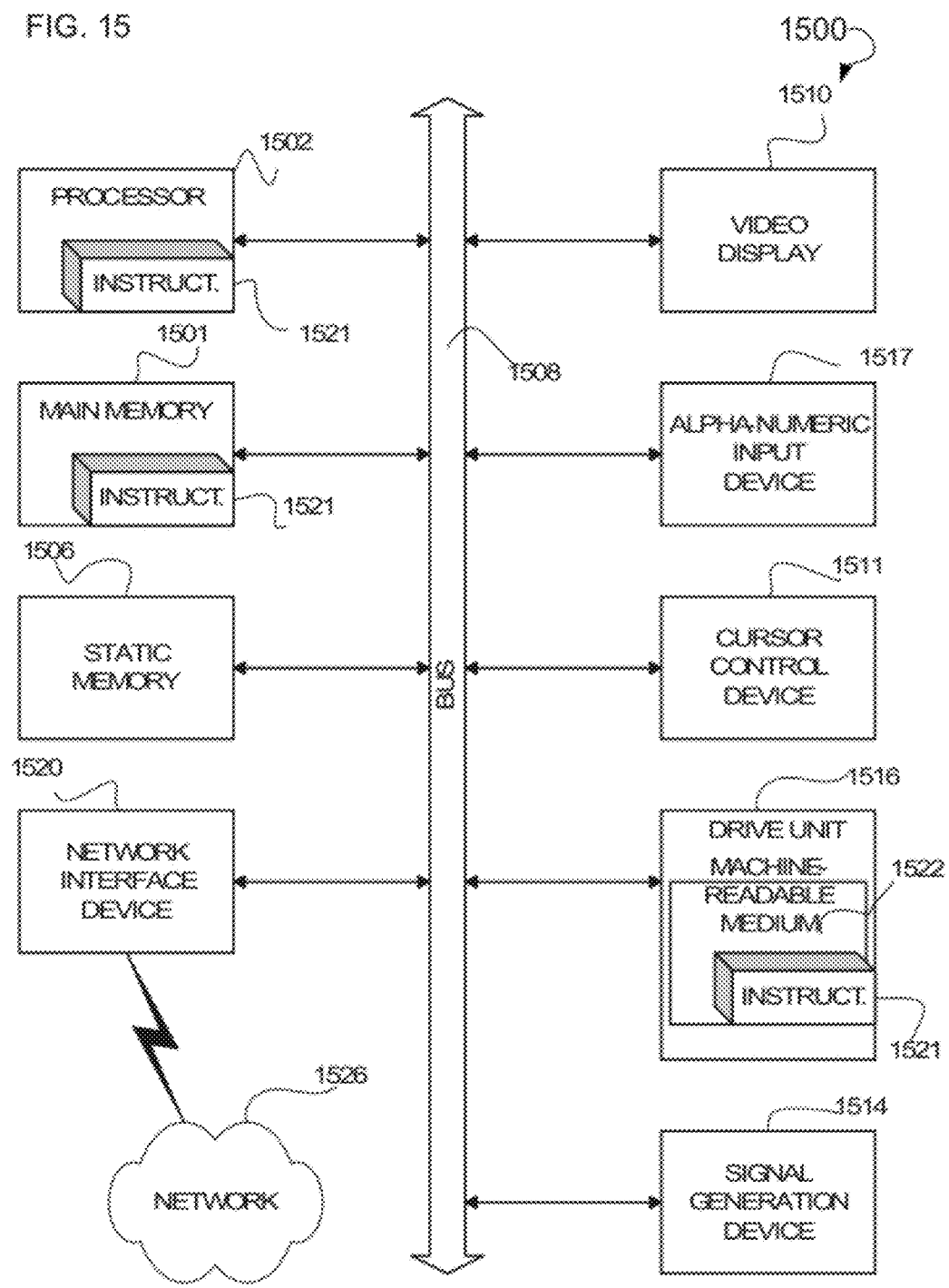
FIG. 15 shows a diagrammatic representation of machine, according to an example embodiment, in the form of a computer system.

FIG. 15 shows a diagrammatic representation of machine in the example form of a computer system 1500 within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a web appliance, a network router, switch, or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a Central Processing Unit (CPU), a Graphics Processing Unit (GPU) or both), a main memory 1501 and a static memory 1506, which communicate with each other via a bus 1508. The computer system 1500 may further include a video display unit 1510 (e.g., a LCD or a CRT). The computer system 1500 also includes an alphanumeric input device 1517 (e.g., a keyboard), a user interface (UI) cursor controller 1511 (e.g., a mouse), a disk drive unit 1516, a signal generation device 1514 (e.g., a speaker) and a network interface device (e.g., a transmitter) 1520.

The disk drive unit 1516 includes a machine-readable medium 1522 on which is stored one or more sets of instructions and data structures (e.g., software) 1521 embodying or utilized by any one or more of the methodologies or functions illustrated herein. The software may also reside, completely or at least partially, within the main memory 1501 and/or within the processor 1502 during execution thereof by the computer system 1500, the main memory 1501 and the processor 1502 also constituting machine-readable media.

The instructions 1521 may further be transmitted or received over a network 1526 via the network interface device 1520 using any one of a number of well-known transfer protocols e.g., Hyper-Text Transfer Protocol (HTTP), Session Initiation Protocol (SIP)).

While the machine-readable medium 1522 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that cause the machine to perform any one or more of the methodologies of the present method and apparatus, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

It is to be understood that the above description is intended to be illustrative, and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the method and apparatus should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
at a routing device in a reactive routing environment, receiving a network address query with respect to a destination address;

at the routing device, determining an aggregate value representing a range of network addresses that includes the destination address, the determining of the aggregate value comprising
identifying from a local routing table of the routing device one or more addresses which are within the range of network addresses and for which the routing device does not have reachability information that indicates reachability of the respective addresses via the routing device, and
sending one or more queries from the routing device with respect to the one or more addresses, to determine reachability of the one or more addresses via the routing device; and
replying to the network address query by advertising the aggregate value.

2. The method of claim 1, wherein the determining of the aggregate value further comprises receiving one or more responses to the one or more queries.

3. The method of claim 1, wherein the determining of the aggregate value further comprises determining that a percentage of addresses within the range of network addresses that can be reached via the routing device satisfies a predefined minimal coverage value.

4. The method of claim 3, wherein the determining of the aggregate value further comprises:
identifying a broader aggregate value representing a larger range of network addresses than the range of network addresses corresponding to the aggregate value, the larger range of network addresses including the destination address; and
determining that a percentage of addresses within the larger range of network addresses that can be reached via the routing device does not satisfy the predefined minimal coverage value.

5. The method of claim 4, wherein the determining of the aggregate value further comprises identifying a plurality of addresses which are within the larger range of network addresses and for which the routing device does not have reachability information, and sending one or more further queries from the routing device with respect to the plurality of addresses.

6. The method of claim 4, wherein the aggregate values are respective network address prefixes, the method comprising recursively determining whether or not progressively shorter prefixes corresponding to progressively larger network address ranges satisfy the minimal coverage value.

7. The method of claim 6, further comprising identifying a shortest prefix that satisfies the minimal coverage value as the aggregate value to be advertised in reply to the network address query.

8. The method of claim 3, wherein the minimal coverage value is 100%.

9. The method of claim 3, wherein the minimal coverage value is less than 100%.

10. A routing device comprising:
a first receiver to receive, in a reactive routing environment, a network address query with respect to a destination address;
a calculation engine to determine an aggregate value representing a range of network addresses that includes the destination address, the calculation engine being configured to determine the aggregate value by an operation comprising identifying from a local routing table of the routing device one or more addresses which are within the range of network addresses and for which the routing device does not have reachability information that indicates reachability of the respective addresses via the routing device,
a transmitter to send one or more queries with respect to the one or more addresses, to determine reachability of the one or more addresses via the routing device; and
an advertising engine to reply to the network address where he by advertising the aggregate value.

11. The routing device of claim 10, further comprising a second receiver to receive one or more responses to the one or more queries.

12. The routing device of claim 10, wherein the calculation engine is further configured to determine that a percentage of addresses within the range of network addresses that can be reached via the routing device satisfies a predefined minimal coverage value.

13. The routing device of claim 12, wherein the calculation engine is further configured to:
identify a broader aggregate value representing a larger range of network addresses than the range of network addresses corresponding to the aggregate value, the larger range of network addresses including the destination address; and
determine that a percentage of addresses within the larger range of network addresses that can be reached via the routing device does not satisfy the predefined minimal coverage value.

14. The routing device of claim 13, wherein the calculation engine is further configured to identify a plurality of addresses which are within the larger range of network addresses and for which the routing device does not have reachability information, the transmitter being configured to send one or more further queries from the routing device with respect to the plurality of addresses.

15. The routing device of claim 13, wherein the aggregate values are respective network address prefixes, the calculation engine being configured recursively to determine whether or not progressively shorter prefixes corresponding to progressively larger network address ranges satisfy the minimal coverage value.

16. The routing device of claim 15, wherein the calculation engine is further configured to identify a shortest prefix that satisfies the minimal coverage value as the aggregate value to be advertised in reply to the network address query.

17. The routing device of claim 3, wherein the minimal coverage value is 100%.

18. An apparatus comprising:
means for receiving, at the apparatus in a reactive routing environment, a network address query with respect to a destination address;
means for determining an aggregate value representing a range of network addresses that includes the destination address, the determining of the aggregate value comprising
identifying from a local routing table of the routing device one or more addresses which are within the range of network addresses and for which the routing device does not have reachability information that indicates reachability of the respective addresses via the routing device, and
sending one or more queries from the routing device with respect to the one or more addresses, to determine reachability of the one or more addresses via the routing device; and
means for replying to the network address query by advertising the aggregate value.

19. Logic encoded in one or more tangible media for execution and when executed operable to:
- at a routing device in a reactive routing environment, receive a network address query with respect to a destination address;
- at the routing device, determine an aggregate value representing a range of network addresses that includes the destination address, the determining of the aggregate value comprising
    - identifying from a local routing table of the routing device one or more addresses which are within the range of network addresses and for which the routing device does not have reachability information that indicates reachability of the respective addresses via the routing device, and
    - sending one or more queries from the routing device with respect to the one or more addresses, to determine reachability of the one or more addresses via the routing device; and
- reply to the network address query by advertising the aggregate value.

\* \* \* \* \*